(No Model.)

J. GRAHAM.
WATER CONDUCTOR FOR TURBINES.

No. 446,287. Patented Feb. 10, 1891.

WITNESSES:
Chas. Nida.
C. Sedgwick.

INVENTOR:
J. Graham
BY Munn & Co.
ATTORNEYS

UNITED STATES PATENT OFFICE.

JOHN GRAHAM, OF MINNEAPOLIS, MINNESOTA.

WATER-CONDUCTOR FOR TURBINES.

SPECIFICATION forming part of Letters Patent No. 446,287, dated February 10, 1891.

Application filed April 26, 1890. Serial No. 349,585. (No model.)

*To all whom it may concern:*

Be it known that I, JOHN GRAHAM, of Minneapolis, in the county of Hennepin and State of Minnesota, have invented a new and Improved Water-Conductor for Turbines, of which the following is a full, clear, and exact description.

The object of the invention is to provide a new and improved water-conductor which is simple and durable in construction, very effective in operation, and especially designed for supplying turbines and other water-wheels with the motive agent.

The invention consists of certain parts and details and combinations of the same, as will be fully described hereinafter, and then pointed out in the claim.

Reference is to be had to the accompanying drawings, forming a part of this specification, in which similar letters of reference indicate corresponding parts in all the figures.

Figure 1:
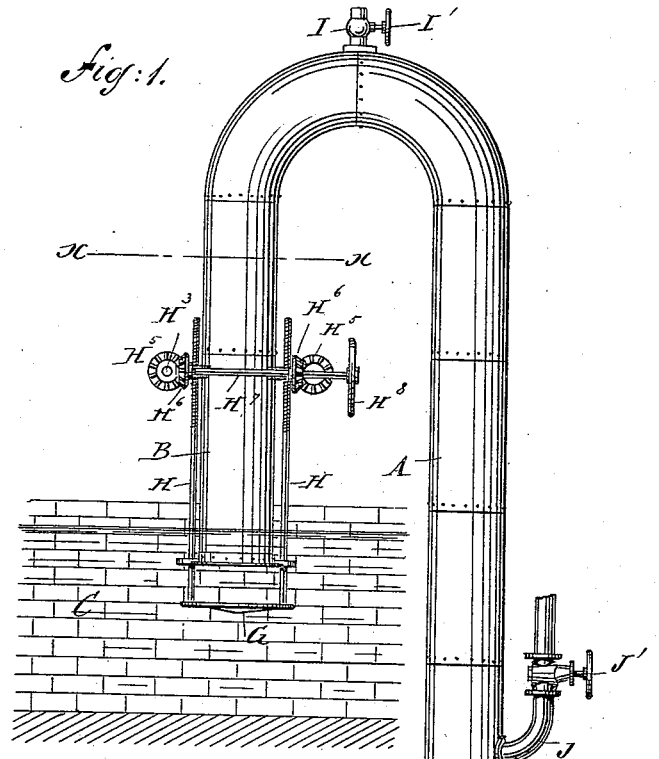
Figure 2:
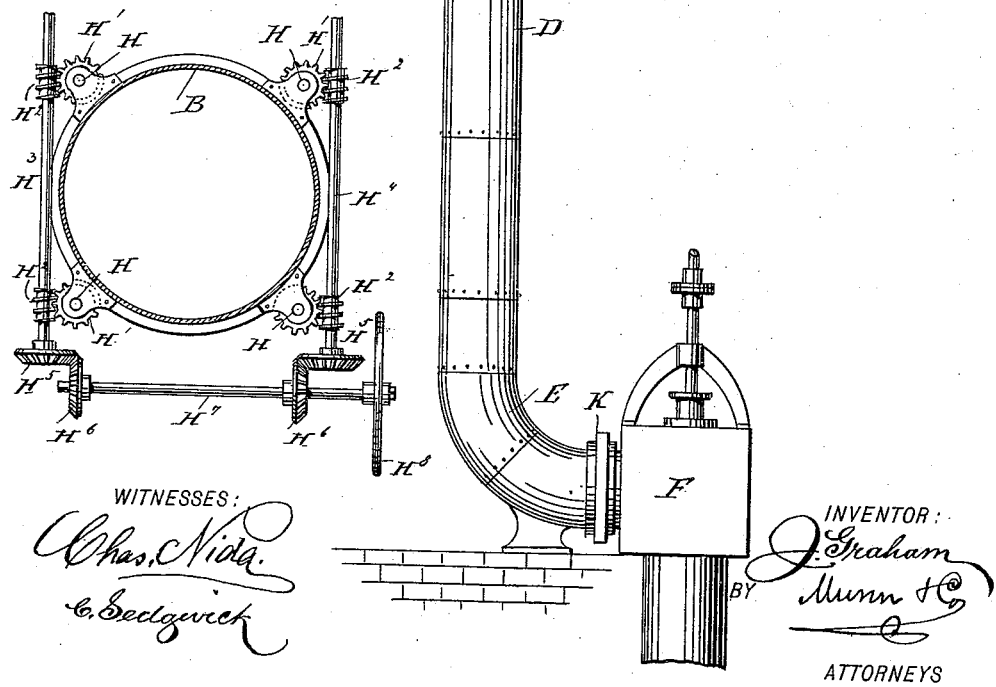

Figure 1 is a side elevation of the improvement. Fig. 2 is an enlarged sectional plan view of part of the same on the line $x\,x$ of Fig. 1.

The improved water-conductor is provided with an inverted-U-shaped pipe A, having a short leg B extending into the water contained in the water-head C, while the longer leg D of the said pipe A is provided with a curved neck E, connected with the turbine F, of any approved construction.

The end of the leg B of the pipe A is adapted to be closed by a valve G, lined with a flexible material on its inside, so as to make a tight fit on the end of the pipe. The valve G is supported on a series of upwardly-extending screw-rods H, mounted to slide in suitable bearings held on the leg B of the said pipe, the said screw-rods being engaged by nuts H', formed with worm-teeth engaged by worms H², secured on shafts H³ and H⁴, (see Fig. 2,) mounted to rotate in suitable bearings arranged on the leg B. On the shafts H³ and H⁴ are held the bevel gear-wheels H⁵, in mesh with the bevel gear-wheels H⁶, secured on a shaft H⁷, mounted to turn in suitable bearings and carrying at one end a hand-wheel H⁸ for conveniently turning the shaft H⁷ so as to turn the shafts H³ and H⁴, which, by the worms H², rotate the nuts H' in order to raise or lower the rods H and the valve G supported by the said rods. Thus by turning the hand-wheel H in one direction the valve G is adapted to close the leg B, and when turned in the opposite direction the end of the leg B, immersed in the water contained in the head C, is opened.

In the middle part of the U-shaped pipe A, on top, is arranged a vent-pipe I, provided with a valve I'. In the leg D is arranged a pipe J, provided with a valve J' and connected with suitable pumping machinery for filling the pipe A with water, as hereinafter more fully described. The pipe J opens into the leg D a suitable distance below the bottom line of the head C.

In the neck E previously mentioned is arranged a gate K for shutting off the water-supply to the turbine F whenever desired.

The operation is as follows: When the operator desires to force the water from the water-head C through the pipe A and to the turbine F, he first closes the valve G and the gate K and opens the valve I' in the vent-pipe I and also the valve J' in the pipe J. The pump connected with the latter pipe is then set in motion, so as to fill the entire pipe A. When this is accomplished the valves I' and J' are closed and the valve G and the gate K are opened, so that now water from the water-head C will flow through the pipe A and the neck E past the gate K into the turbine F to operate the same. It will thus be seen that the turbine F is rotated with a pressure equal to the weight of the column of water in the leg D of the pipe A.

Having thus fully described my invention, I claim as new and desire to secure by Letters Patent—

The combination, with the vertical pipe having a long and short leg, the water-inlet pipe J, connected with the long leg between its ends, and the valved vent I, of the horizontal valve G under the open lower end of the short leg, vertical parallel screw-rods H, mounted in bearings on the sides of said short leg and carrying the said valve, pinions H' on the screw-threaded portions of said rods, parallel transverse shafts $H^4$, having worms $H^2$ meshing into said pinions, bevel-gears $H^5$ on said shafts, the operating-shaft $H^7$, having
5 bevel-gears $H^6$ meshing into the gears $H^5$, the gate K at the lower or discharge end of the long leg, and the turbine F, into which said lower end discharges, substantially as set forth.

JOHN GRAHAM.

Witnesses:
 JOSEPH S. LEMON,
 O. E. BRAND.